(12) United States Patent
Agarwal et al.

(10) Patent No.: US 7,447,646 B1
(45) Date of Patent: Nov. 4, 2008

(54) METHOD AND COMPUTER-READABLE MEDIUM FOR AUTOMATED DYNAMIC PRICING OF PRODUCTS WITH PARAMETER-DRIVEN STATE TRANSITIONS

(75) Inventors: Amit Agarwal, Bangalore (IN); B Anthony Joseph, Bellevue, WA (US); Sean M O'Neill, Seattle, WA (US); Joshua B Sandbulte, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 213 days.

(21) Appl. No.: 10/948,961

(22) Filed: Sep. 23, 2004

(51) Int. Cl.
*G06Q 30/00* (2006.01)
(52) U.S. Cl. .................. 705/26; 705/1; 705/37
(58) Field of Classification Search .................. 705/26, 705/27, 1, 37
See application file for complete search history.

(56) References Cited

U.S. PATENT DOCUMENTS

| | | | |
|---|---|---|---|
| 6,507,822 B1* | 1/2003 | Walker et al. .................. 705/20 |
| 6,604,089 B1* | 8/2003 | Van Horn et al. ............. 705/26 |
| 2001/0047308 A1* | 11/2001 | Kaminsky et al. ............. 705/26 |
| 2002/0116348 A1* | 8/2002 | Phillips et al. .............. 705/400 |
| 2002/0188551 A1* | 12/2002 | Grove et al. .................. 705/37 |
| 2003/0028469 A1* | 2/2003 | Bergman et al. .............. 705/37 |
| 2003/0061137 A1* | 3/2003 | Leung et al. .................. 705/35 |
| 2003/0204448 A1* | 10/2003 | Vishik et al. .................. 705/27 |
| 2004/0068459 A1* | 4/2004 | Goulet et al. ................. 705/37 |
| 2004/0267630 A1* | 12/2004 | Au et al. ....................... 705/26 |
| 2005/0187859 A1* | 8/2005 | Growney et al. ............. 705/37 |
| 2005/0197950 A1* | 9/2005 | Moya et al. .................. 705/37 |
| 2005/0283406 A1* | 12/2005 | Kuelbs et al. ................ 705/26 |

OTHER PUBLICATIONS

Paul Klemperer, What really matters in auction design, Winter 2002, The Journal of Economic Perspectives, vol. 16, p. 169-190.*

* cited by examiner

*Primary Examiner*—Jeffrey A. Smith
*Assistant Examiner*—Jason B. Dunham
(74) *Attorney, Agent, or Firm*—Christensen O'Connor Johnson Kindness PLLC (57) ABSTRACT

The pricing of a product is programmatically managed by defining a plurality of pricing states for the product. Each pricing state has a pricing mechanism associated therewith. A pricing mechanism can be a variable pricing mechanism such as an auction. It can also be a fixed pricing mechanism for the sale, rental, or subscription of the product. One or more triggers are defined, each of which may include one or more trigger parameters, to enable the pricing of the product to transition from one pricing state to another pricing state. In this manner, the invention provides a seller with an automated, systematic approach to pricing management.

35 Claims, 8 Drawing Sheets

METHOD AND COMPUTER-READABLE MEDIUM FOR AUTOMATED DYNAMIC PRICING OF PRODUCTS WITH PARAMETER-DRIVEN STATE TRANSITIONS

FIELD OF THE INVENTION

The present invention relates to methods and systems for pricing of products and, more particularly, to price management of products.

BACKGROUND OF THE INVENTION

Good pricing practices are crucial for businesses and individuals that sell products. A good pricing practice should be flexible to accommodate a multitude of variables such as market conditions, customer demand, product cycle, and competitors. A good pricing practice should also respond quickly to changing conditions. As a result, sellers need to carefully track and manage the pricing of their products.

Pricing management is a process sellers use to determine and set an optimum price for their products to achieve their short-, medium-, and long-term goals for sales volume, market position, brand identity, and revenue. Currently, after setting a price for a product, a seller has to frequently monitor the sales of the product to determine whether a product is selling well at the current price and whether to adjust the price of the product. For example, if a product is highly depreciable, such as an electronic device, the seller may need to continually monitor the sales of the product. This can be a time-consuming and exhausting process. It can also be emotionally distressing to continually consider changing the price of products.

Once sellers set the price of a product, they tend to neglect to adjust the price according to market conditions. This often results in reduced profits and lost opportunities since the price of the product may fail to reflect market reality.

Therefore, what is needed is an automated solution that reduces the burden on sellers to constantly monitor and manually adjust the pricing of their products. Embodiments of the present invention address this need and other shortcomings that exist in current systems.

SUMMARY OF THE INVENTION

As will be seen from the description herein, embodiments of the present invention include a method, computer-readable medium, and system for automated dynamic pricing of a product. A product may be any type of goods or services that a seller can provide.

According to one aspect of the invention, a product offering may have several pricing states. Each pricing state has associated therewith a pricing mechanism and one or more triggers that enable a product to transition from a current pricing state to another pricing state. A product may also transition back to a previous pricing state or may change one or more terms or conditions and repeat the current pricing state.

The pricing mechanism of a pricing state determines the price at which the product is offered to customers and possibly how the price may vary while in the current pricing state. For example, if a supply of a fancied product is scarce, a variable pricing mechanism, such as an auction, may be used to maximize the selling price. When a greater supply of the product is available, a fixed pricing mechanism, such as a fixed price sale, may then be used. As the product progresses toward the end of its life cycle, other fixed pricing mechanisms, such as a fixed price rental or subscription of the product, or a variable price mechanism, such as an auction, may again be employed. A pricing mechanism contains one or more criteria that determine the pricing of the product. A pricing mechanism may also determine the mode of ownership for the product, such as a sale where ownership of the product is transferred to the buyer, or rental where ownership of the product is retained by the seller but the buyer has purchased a right to use the product, usually for a specified period of time. Generally, any pricing mechanism may be associated with a pricing state.

According to another aspect of the invention, one or more triggers are associated with each pricing state. A trigger is defined to enable the pricing of the product to automatically transition from one pricing state to another pricing state. A trigger may be based on an event or derived from data. A trigger contains one or more parameters (trigger parameters), the satisfaction of which enables the transition of pricing states to occur. Examples of such trigger parameters may include, without limitation, data about the product itself, i.e., a number of product units sold, a pricing history of the product, a sales ranking of the product, an amount of inventory left, the release of a new edition or version of the product, etc. A trigger parameter can also result from analyzing data about the competitive landscape, e.g., the number of vendors selling the same or a similar product or the percentage of market share that the product currently enjoys. A seller may specify to include or exclude data about a particular competitor. Other examples of trigger parameters may include passage of a period of time (such as the number of days the product has been in a given pricing state) or a number of visitors to a Web page describing the product (e.g., number of page views). A trigger parameter can also be a specific date or time, e.g., the day after Christmas, or a range of dates or times, e.g., ten days after Labor Day, or the 2nd and 4th Saturdays of every month, etc.

Information for pricing states, pricing mechanisms, triggers, and the events or data on which triggers are based may be automatically obtained internally or received externally from the seller of the product or a third party.

Embodiments of the invention provide a programmatic way for a seller to automatically adjust the price of a product throughout the life cycle of the product offering. Sellers are thus able to efficiently manage the pricing of their products in an automated, systematic approach, which saves the seller time and also reduces the emotion invested in the product pricing process.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In general terms, the present invention provides a system and method for automated dynamic pricing of a product. As used herein, the term "products" can refer to tangible goods such as books or digital cameras, intangible goods such as ideas and services, or a combination of tangible goods and intangible goods, such as an individual cell phone plan that includes both a cell phone and a wireless service plan. The pricing of a product is divided into a plurality of stages, also referred to herein as pricing states. Associated with each pricing state is a pricing mechanism that is used to determine at what price the product is available and possibly how the price may vary during the pricing state. One or more triggers are also associated with each pricing state (except, perhaps, a concluding pricing state for the product). A trigger is defined to enable the pricing of the product to transition from one pricing state to another pricing state in an automated fashion. Computer-implemented processes for defining a plurality of pricing states, their associated pricing mechanisms, and the corresponding triggers may be performed using input received from a seller or others, or may be performed automatically by a dynamic pricing program. The description that follows provides first an overview of an environment in which exemplary embodiments of the invention may be implemented, followed by a depiction of alternative embodiments of a dynamic pricing program and sample user interface that illustrate the operation of an embodiment of the invention.

Figure 1:
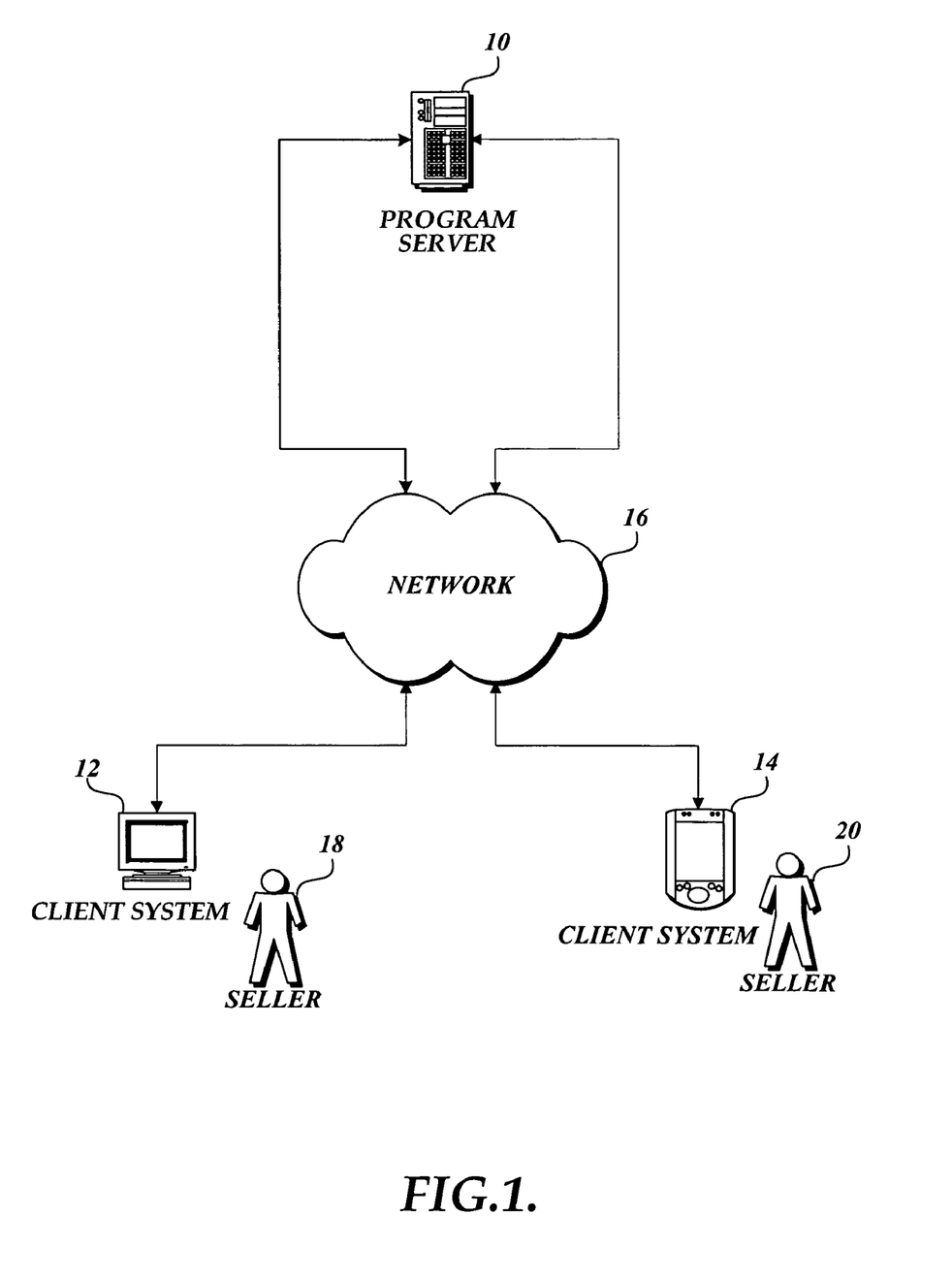
FIG. 1 is a pictorial diagram showing an exemplary environment in which embodiments of the invention may be implemented.

To provide a context for understanding the exemplary embodiments discussed herein, FIG. 1 provides an overview of a computing environment in which embodiments of the invention may be implemented. The depicted environment includes a program server 10 and one or more client systems 12, 14 communicatively connected by a network 16. The client system 12 is shown associated with a seller 18, while the client system 14 is shown associated with a seller 20. A seller is any entity that wishes to provide a product, including a seller of record that contacts an order fulfillment center to arrange for actual delivery of the product. A product may be provided to a buyer by auction, by sale, by rental, or by subscription, for example. If desired, buyers (not shown in FIG. 1) may similarly connect to the program server 10 via the network 16 to obtain products from the sellers.

As will be described below in regard to exemplary embodiments, the program server 10 is configured to implement an automated dynamic pricing program that manages the pricing of a product. The automated dynamic pricing program may be driven by particular events, such as the release of new versions of a product, specific holidays, conclusion of a specified time period, etc. Alternatively, or in addition, the automated pricing program may be driven by data such as remaining inventory, measurement of customer demand, etc. Such data may be automatically obtained from internal records available to the program server 10 or received externally from the seller or a third party.

As noted, the program server 10 may be configured to provide a dynamic pricing program defined by input received from sellers of products. For example, the seller 18 may operate the client system 12 to input information to the program server 10 via the network 16 for dynamic pricing of a product. The network 16 may be a Local Area Network ("LAN"), a larger network such as a Wide Area Network ("WAN"), or a collection of networks, such as the Internet. Protocols for network communication, such as TCP/IP, are well known to those skilled in the art of computer networks.

FIG. 1 provides a simplified example of just one suitable computing environment for implementing embodiments of the invention and does not limit the invention thereto. In some embodiments, the computing systems shown, e.g., the program server 10 and the client system 12, may be implemented in a single computing system and thus not require a network for communication between the combined systems.

Figure 2:
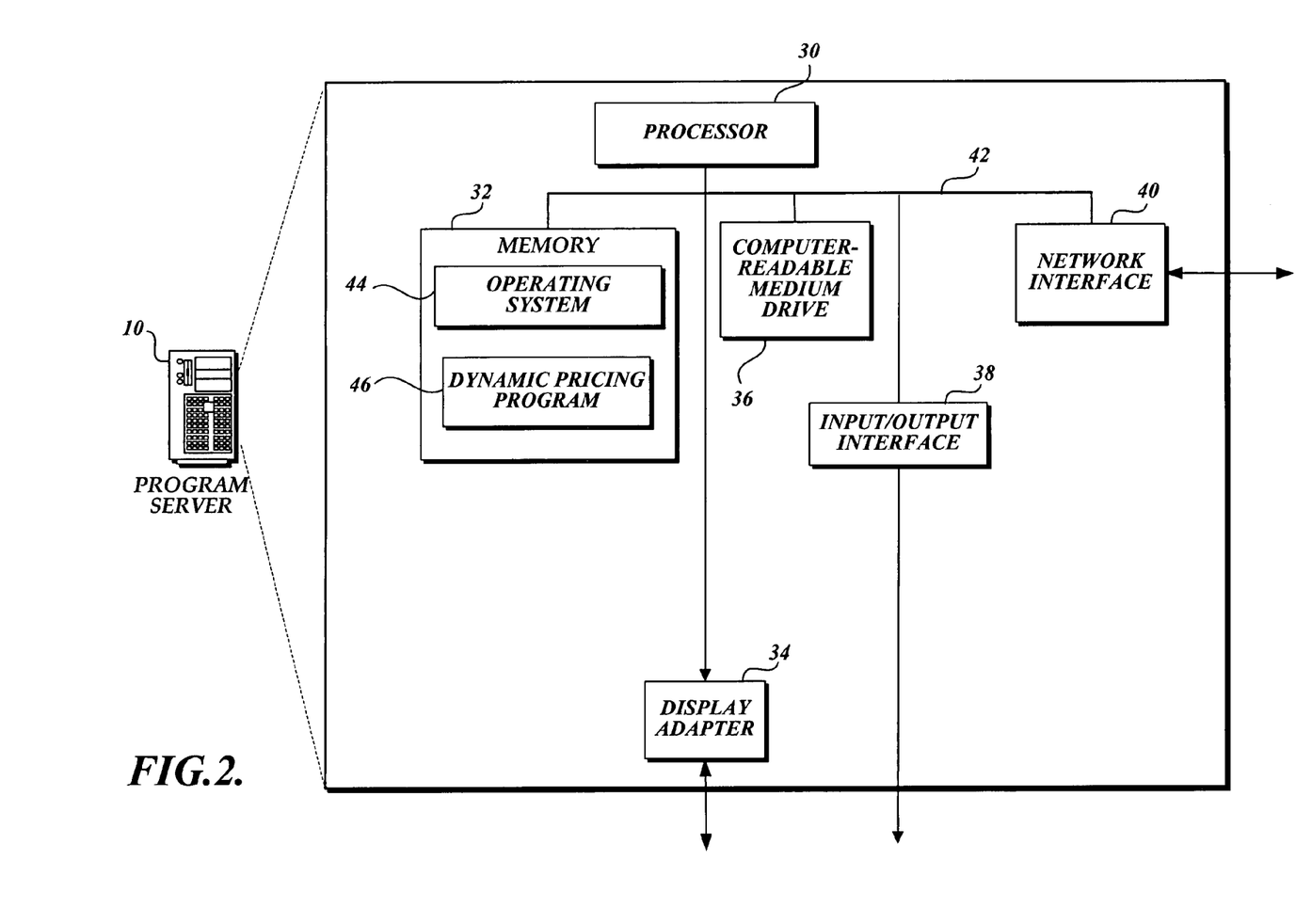
FIG. 2 is a block diagram showing exemplary components that may be incorporated in a program server as depicted in FIG. 1.

FIG. 2 depicts an exemplary computer architecture for the program server 10 shown in FIG. 1. The program server 10 is connected to the network 16 (FIG. 1) using a network interface 40 that includes the necessary communications hardware and software for the program server 10 to communicate with other computing devices on the network 16. The program server 10 further includes a processor 30, a memory 32, a video display adapter 34, a computer-readable medium drive 36 (e.g., disk drive), and an input/output interface 38, all communicatively connected together and to the network interface 40 by a communication bus 42. The memory 32 generally comprises RAM, ROM, and/or permanent memory. The memory 32 stores an operating system 44 for controlling the general operation of the program server 10. The operating system 44 may be a general purpose operating system such as a Microsoft® operating system, UNIX®, or Linux® operating system.

The memory 32 additionally stores program code and data for implementing a dynamic pricing program 46 that provides automated pricing management for a product. In one embodiment, the dynamic pricing program 46 uses a Web browser interface that displays configurable markup documents, such as the sample Web pages shown in FIGS. 5-7, to communicate with the seller. The dynamic pricing program 46, however, is not limited to using a Web interface; it may use any application that can access and use a computer resource and communicate with a seller of a product.

The video display adapter 34 provides display signals to a local display (not shown in FIG. 2). The input/output interface 38 likewise communicates with external devices not shown in FIG. 2, such as a mouse, keyboard, scanner, pen, and/or other input devices. Of course, those skilled in computers will appreciate that the program server 10 may include greater or fewer components than those shown in FIG. 2 and still achieve the advantages of the present invention.

Moreover, the program server 10 may be operated by the same entity that operates the client system 12 or 14, such as seller 18 or seller 20. The functions of the program server 10 and the client system 12 or 14 may even be provided by the same computing system. The program server 10 may also be operated by a third party unrelated to the sellers 18, 20.

Figure 3A:
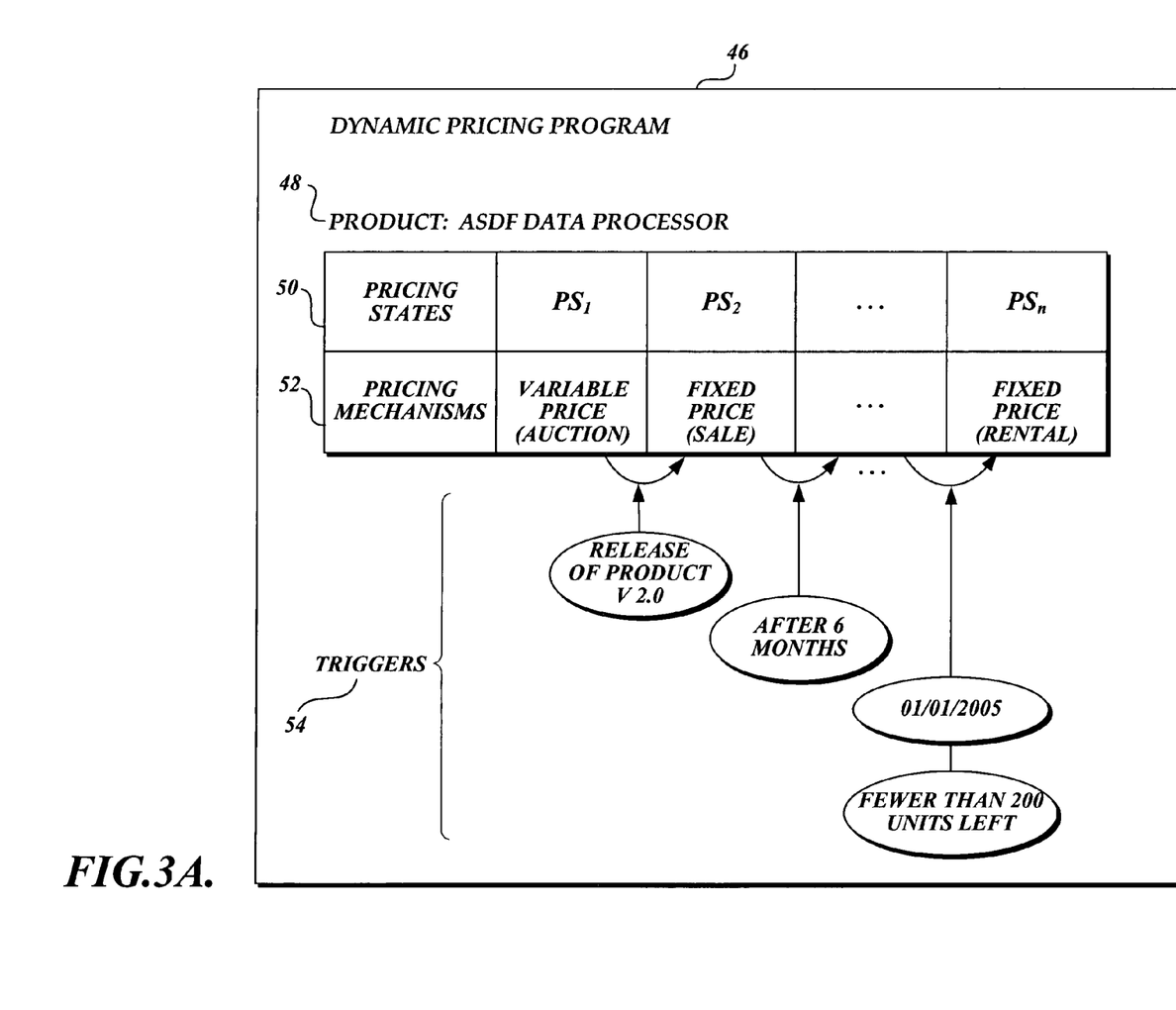
FIG. 3A is a block diagram illustrating one exemplary embodiment of a dynamic pricing program as depicted in FIG. 2.

FIG. 3A is a block diagram illustrating an exemplary embodiment of a dynamic pricing program 46 as depicted in FIG. 2. More specifically, FIG. 3A illustrates a plurality of pricing states, and their associated pricing mechanisms and triggers for a product 48, the product being named "ASDF Data Processor" in this example.

A seller using the dynamic pricing program 46 defines a plurality of pricing states as indicated at reference numeral 50. For example, in FIG. 3A, the product 48 has pricing states labeled $PS_1$, $PS_2$, ... and $PS_n$ associated therewith. The number of pricing states 50 for a product is not limited and can either be automatically decided by the dynamic pricing program 46 or determined by the seller of the product or some other party.

Associated with each pricing state 50 is a pricing mechanism 52. The pricing mechanism 52 determines the price at which the product 48 is available and possibly the manner in which the price may vary while in a particular pricing state 50. Embodiments of the invention can accommodate all types of pricing mechanisms. In some embodiments, the pricing mechanisms may be categorized into two major types: variable pricing mechanisms and fixed pricing mechanisms. As indicated by the name, in a variable pricing mechanism such as an auction, the price of the product may change while the pricing state remains unchanged. On the other hand, the price of a product associated with a fixed pricing mechanism, such as a sale, rental, or a subscription, does not change unless and until the corresponding pricing state changes. Any pricing mechanism may be associated with any pricing state. Accordingly, a pricing state with a fixed pricing mechanism may transition to another pricing state with a fixed pricing mechanism or a variable pricing mechanism. As will be seen herein, there is no limitation on the type of pricing mechanism that may be used with any one pricing state or subsequent pricing state.

For example, in FIG. 3A, the pricing mechanism associated with pricing state $PS_1$ is an auction, which is a variable pricing mechanism. The pricing mechanism associated with pricing state $PS_2$ uses a fixed pricing mechanism, in this case, a sale of the product. The pricing mechanism associated with pricing state $PS_n$ for rental of the product may also be a fixed pricing mechanism. Each pricing mechanism includes one or more criteria, such as terms and conditions, that define the pricing mechanism.

A variable pricing mechanism may be used, for example, when a product 48 is newly introduced into the market and only a limited supply of the product is available. Early adopters of new technologies or products are most likely to compete for the limited availability of the product 48. Thus, as shown in FIG. 3A, using a variable pricing mechanism, such as an auction, for the first pricing state $PS_1$ may tend to maximize the potential revenue from sales of the product 48. An auction pricing mechanism may be further defined by criteria such as the starting price of the product 48, the number of units of the product 48 available for auction, the minimum bid price increment, and the start and end times of the auction.

Once the product 48 begins to mature and enters a mainstream market, the product supplies may become sufficient to meet the general demand. In this situation, the seller may have implemented a trigger in the dynamic pricing program 46 that automatically shifts the product to a pricing state with a fixed pricing mechanism such as a fixed price sale for the product 48. As another example, a pricing state with an auction pricing mechanism may be set to transition to a pricing state with a fixed pricing mechanism when a period of time has elapsed with no bid placed for the product.

In some embodiments of the invention, a fixed price sale may be a discount sale, where the price of the product 48 is a certain percentage or amount lower than the price set by the pricing mechanism in the previous pricing state. Criteria associated with a discount sale pricing mechanism may include, but are not limited to, a base price (which, for example, may be established by the pricing in a prior pricing state), an amount or percentage-based discount, and a floor price, i.e., a minimum price, for the product 48. The price for a discount sale for the product 48 may also be determined based on pricing data obtained from an analysis of competitors' products. A seller may include or exclude pricing data about a competitor's product based on information about the competitor, such as the size, reputation, feedback, or other trust indicators or information about the competitor.

After a specified period of time, the dynamic pricing program 46 may automatically transition to the next pricing state, and so on. As the product 48 approaches the end of its life cycle, the demand for the product 48 may begin to decline. Ways to maximize the revenue from the remaining inventory are to use them as rental or subscription items, or even to auction them off. For example, in FIG. 3A, the dynamic pricing program 46 uses a fixed pricing mechanism for the rental of the product 48 once it enters its final pricing state $PS_n$.

The dynamic pricing program 46 further includes a plurality of triggers 54. A trigger 54 enables the pricing of the product 48 to transition from the pricing mechanism 52 associated with the current pricing state 50 to the pricing mechanism 52 associated with the next pricing state 50. A trigger 54 is generally specified by one or more trigger parameters. When the one or more trigger parameters of a trigger 54 is satisfied, the product 48 automatically transitions from the current pricing state to another pricing state.

For example, FIG. 3A illustrates three pricing state transitions. The first state transition is from the pricing state $PS_1$ to the pricing state $PS_2$, triggered by the release of a new version ("v 2.0") of the product ("ASDF Data Processor"). Information about the release of a product may be obtained internally or externally, such as from a manufacturer or vendor of the product. After being in the pricing state $PS_2$ for six months, the product 48 ("ASDF Data Processor") transitions to the next pricing state, and so on. Multiple trigger parameters may be associated with a trigger. For example, as illustrated by FIG. 3A, on a specified date ("Jan. 1, 2005"), if there are fewer than 200 units remaining in inventory, the product 48 is shown transitioning to the last pricing state $PS_n$. Multiple triggers may be conjunctive or alternative.

A trigger 54 can be driven by an event or by data, such as data relating to the product 48 and/or competitors' products. A seller of the product 48 can also provide input that defines a trigger. Besides the exemplary trigger parameters shown in FIG. 3A, a trigger 54 can include other trigger parameters. Non-limiting examples of other trigger parameters include: a number of units sold; a sales ranking of the product 48; the number of people who have visited a Web page for the product 48 or otherwise viewed a description of the product; when feedback from customers of the product 48 reaches a certain level; the result of analyzing the pricing history of the product 48 or competitors' products, etc. Information about a competitor's products may be included or excluded by a seller based on the size, reputation, feedback, or other indicators about the competitor. Some exemplary trigger parameters are further illustrated in FIG. 6.

The dynamic pricing program 46 may also allow trigger parameters to change during the implementation of the pricing program 46. For instance, if an inventory for the product 48 moves fast in the current pricing state, a trigger parameter may be automatically modified to delay the transition to the next pricing state, for example, until the inventory movement falls off, provided the trigger associated with the current pricing state is configured to take into account the dynamic sales data of the product 48. On the other hand, if the inventory for the product 48 does not move or moves slower than the seller of the product 48 expected, the trigger parameter associated with the trigger may be automatically modified to expedite the transition from the current pricing state to the next pricing state.

In yet another example, the seller of the product 48 may specify a trigger parameter that results in a short duration of a pricing state (e.g., lasting only a few minutes or hours). This type of product pricing can be used to promote a "blowout special." If desired, such blowout specials may be displayed in an obvious way to catch the attention of potential buyers.

In some embodiments of the invention, the dynamic pricing program 46 can automatically define the pricing states, the pricing mechanisms and their associated criteria, and the triggers and their associated trigger parameters, using data generated internally or provided by the seller or seller-authorized parties. They may also be manually defined by specific input from the seller of the product, or by a third party authorized by the seller.

In another exemplary embodiment, a series of pricing states using a same pricing mechanism, such as a discount sale, may be defined with a single set of input where the seller specifies criteria, such as a starting price; a duration for each pricing state or alternatively, a time interval during which the product will go through a specified number of pricing states; a percentage or amount of discount of the price of the product in each pricing state; and a floor price. For example, a seller may specify the product 48 illustrated in FIG. 3A to go through a series of pricing states with discount sales between Sep. 15, 2004, and Mar. 15, 2005. The price of the product 48 in each pricing state may be specified to be 10% less than the price of the previous pricing state, and the duration of each pricing state may be specified to be one month. The seller may also specify the starting price for the series of discount sales to be $200 and the floor price for the product should be $60. Once the dynamic pricing program 46 receives these specifications, it automatically configures and creates the series of pricing states.

Figure 3B:
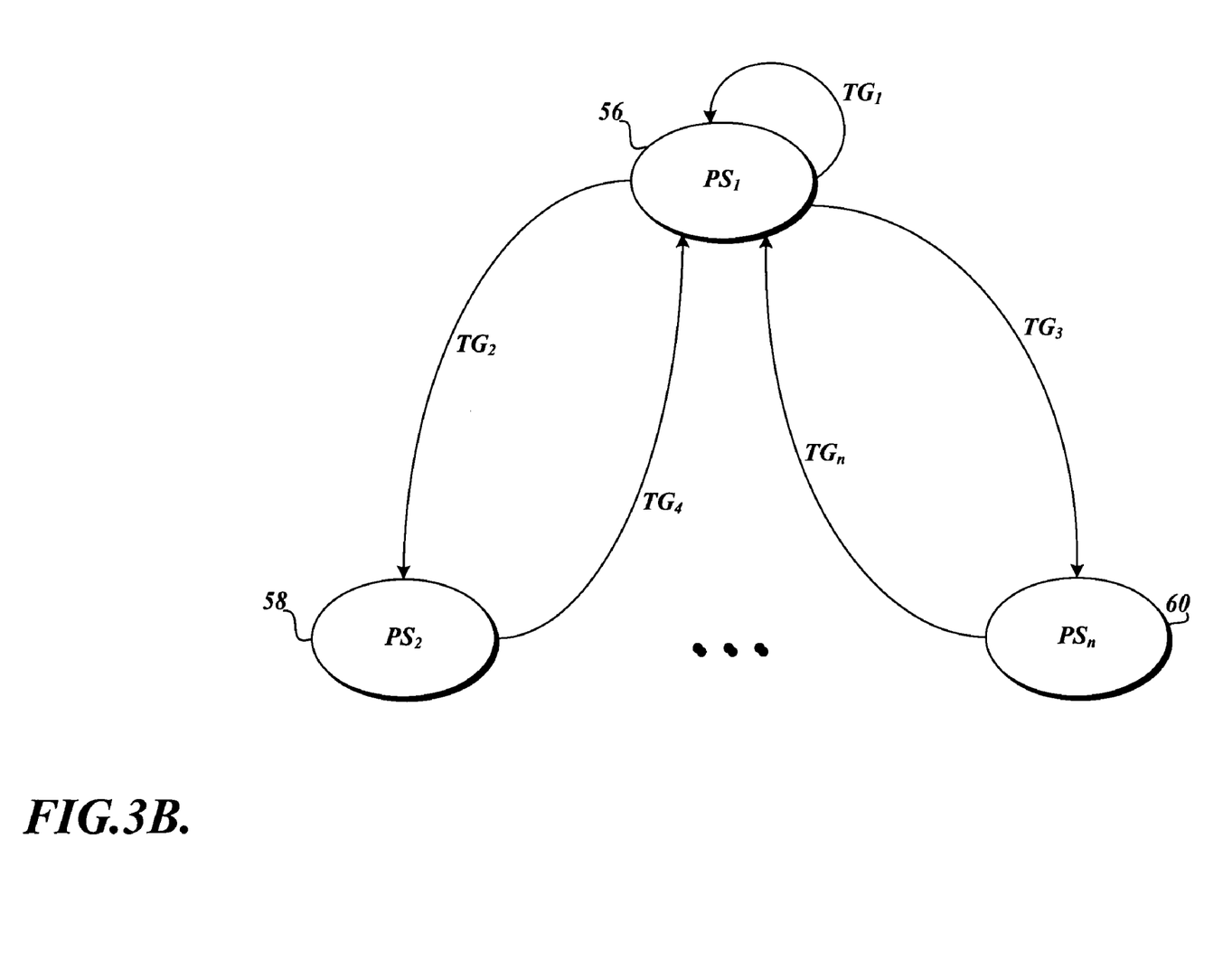
FIG. 3B is a state diagram illustrating another embodiment of the invention.

The block diagram shown in FIG. 3A pictorially illustrates just one exemplary embodiment of a dynamic pricing program 46, where the product 48 transitions through the defined pricing states in a linear fashion. The pricing states in a dynamic pricing program may be more complex. For instance, FIG. 3B illustrates another exemplary embodiment of the dynamic pricing program 46 where the product 48 may repeat the use of pricing states, and pricing states may have multiple triggers. Pricing states with multiple triggers may provide distinct transition paths. For example, the pricing state $PS_1$ (56) in FIG. 3B has three triggers—$TG_1$, $TG_2$, and $TG_3$. Upon the satisfaction of trigger $TG_2$, the product 48 transitions from pricing state $PS_1$ (56) to pricing state $PS_2$ (58). Upon the satisfaction of trigger $TG_3$, the product 48 transitions from pricing state $PS_1$ (56) to pricing state $PS_1$ (60). If trigger $TG_1$ instead is satisfied, the product 48 "transitions" to repeat the pricing state $PS_1$ (56) it was in previously, perhaps with different criteria defining the pricing mechanism for pricing state $PS_1$ (56). Such a situation may occur, for example, when market conditions for product 48 reveal that the best option for product 48 is to continue using the pricing mechanism associated with $PS_1$ (56) but, perhaps, with different terms or conditions. There is no prohibition against different pricing states using the same pricing mechanism so "repeating" a pricing state could also be conceptually viewed as transitioning from one pricing state to another, if desired, which may depend on the implementation of the dynamic pricing program 46.

In another embodiment of the invention, a product may revert back to a previously used pricing state. A pricing state may be used multiple times during the life cycle of a product offering. For example, as illustrated by FIG. 3B, product 48 reverts back to its previous pricing state $PS_1$ (56) upon the satisfaction of trigger $TG_4$ that is associated with pricing state $PS_2$ (58). Similarly, if the product 48 is in the pricing state $PS_n$ (60) and trigger $TG_n$ is satisfied, the product 48 transitions from pricing state $PS_n$ (60) to pricing state $PS_1$ (56).

Figure 4:
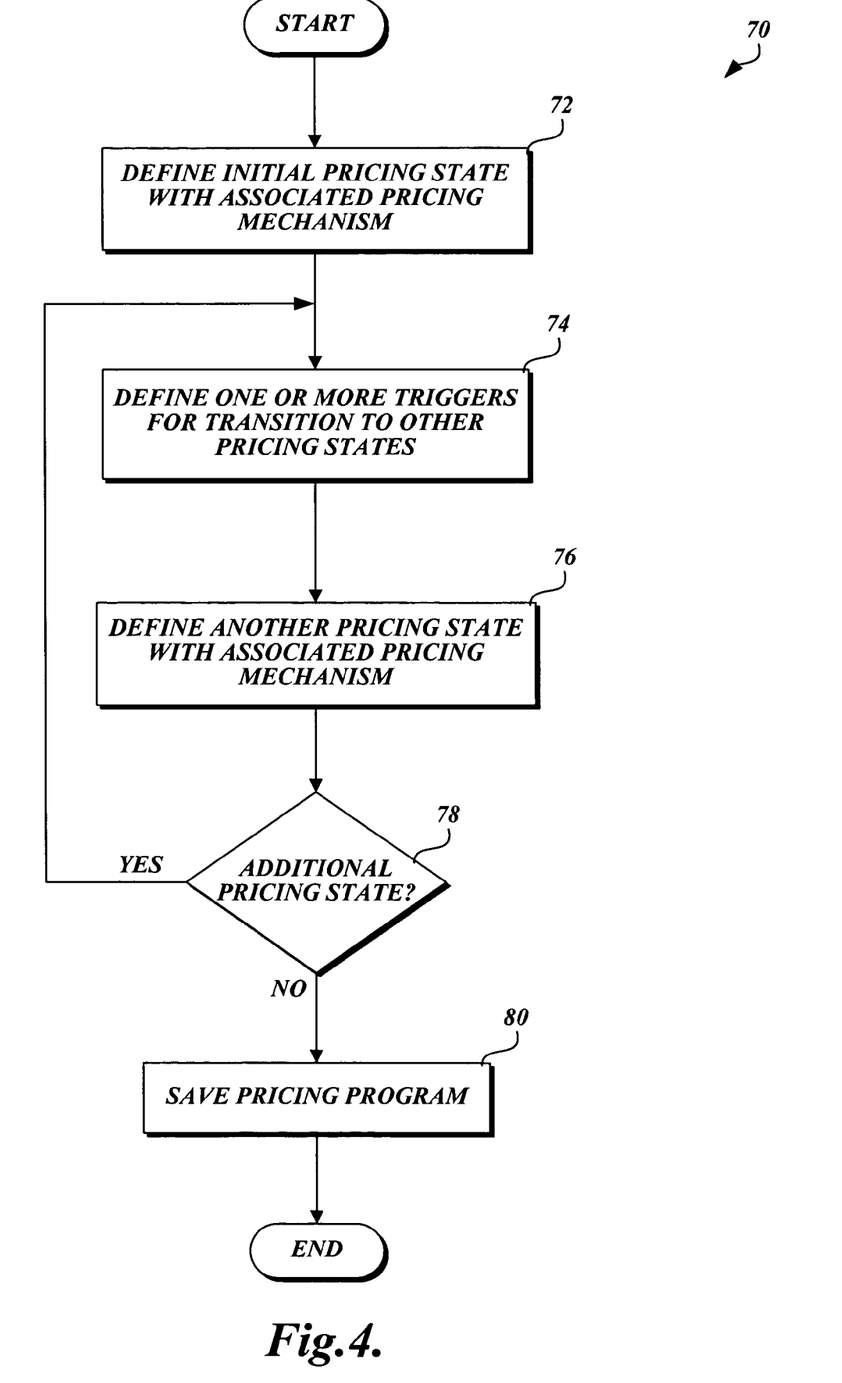
FIG. 4 is a flow diagram illustrating one exemplary method for defining a dynamic pricing program in accordance with the present invention.

FIG. 4 illustrates a flow diagram of an exemplary method 70 for configuring a dynamic pricing program 46 such as the one illustrated in FIG. 3A. The method 70 starts by defining an initial pricing state and pricing mechanism associated with the initial pricing state, as indicated at block 72. If desired, a default pricing mechanism, such as an auction, may be associated with a pricing state in the absence of specific input from the seller. A seller can provide dynamic pricing input in any way, including using a text file, a spreadsheet, or through a Web user interface as by executing word processing, spreadsheet, or Web browser software, respectively, on the client system 12 or 14 shown in FIG. 1. An exemplary interface allowing a seller to provide input for defining an initial pricing state and pricing mechanism is described below in regard to FIG. 5.

The method 70 then proceeds to receive input that defines one or more triggers associated with the initial pricing state, as indicated at block 74. A trigger may include one or more trigger parameters, the satisfaction of which will automatically initiate a transition to another pricing state when the dynamic pricing program is implemented. An exemplary interface allowing a seller to provide input for defining a trigger is described below in regard to FIG. 6.

Figure 7:
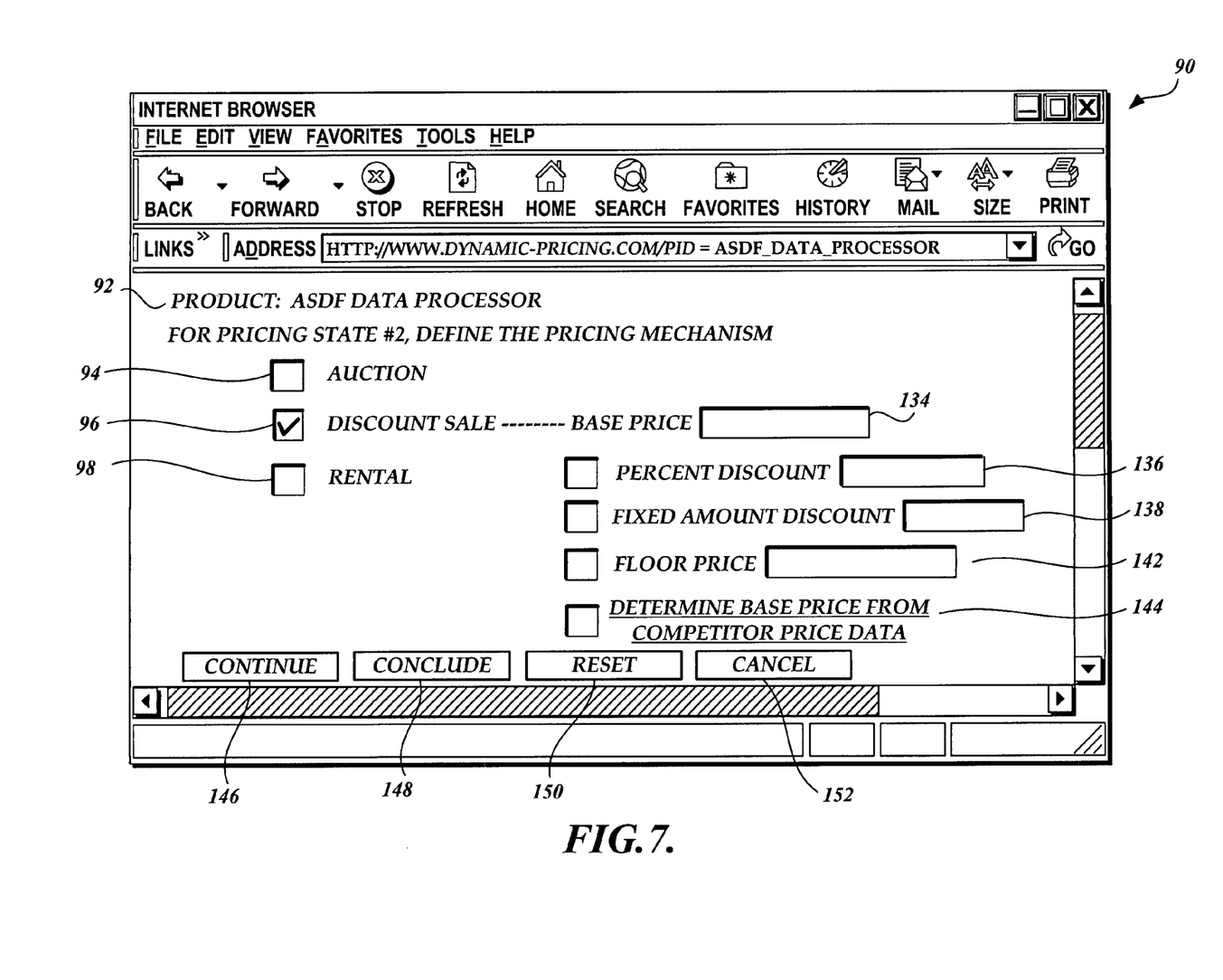

The method 70 then proceeds to define another pricing state and pricing mechanism associated therewith, as indicated at block 76. FIG. 7, discussed below, features an exemplary interface that allows a seller to define a subsequent pricing state and pricing mechanism. At decision block 78, the method 70 determines whether an additional pricing state will be defined for the product. If an additional pricing state is desired, the method 70 loops back to block 74 to define the trigger for transition to the additional pricing state. If there is no additional pricing state for the product, the method 70 proceeds from decision block 78 to save the information for dynamic pricing of the product, as indicated at block 80. As will be appreciated by those skilled in the art and others, method steps described herein may be interchangeable with other steps, or several combinations of steps, and still achieve the advantages of the invention. When the dynamic pricing program 46 is implemented, the pricing of the product 48 may vary based on the pricing mechanism of the pricing state currently applicable to the product. The pricing program may be immediately implemented or stored for implementation at a later time.

Figure 5:
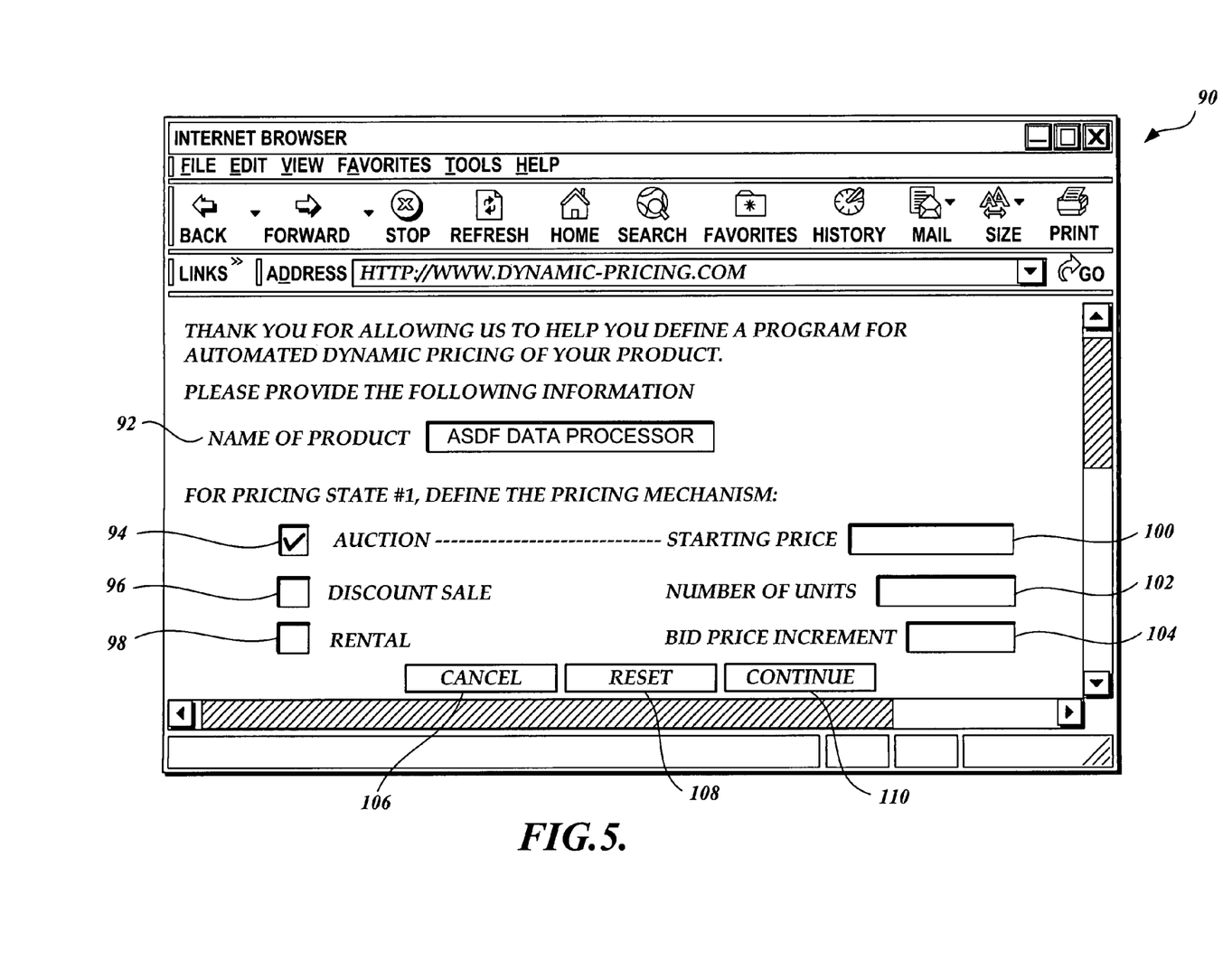
FIGS. 5-7 are display diagrams showing a typical Web browser interface configured to allow a seller to input data defining a dynamic pricing program in accordance with one embodiment of the present invention.
Figure 6:
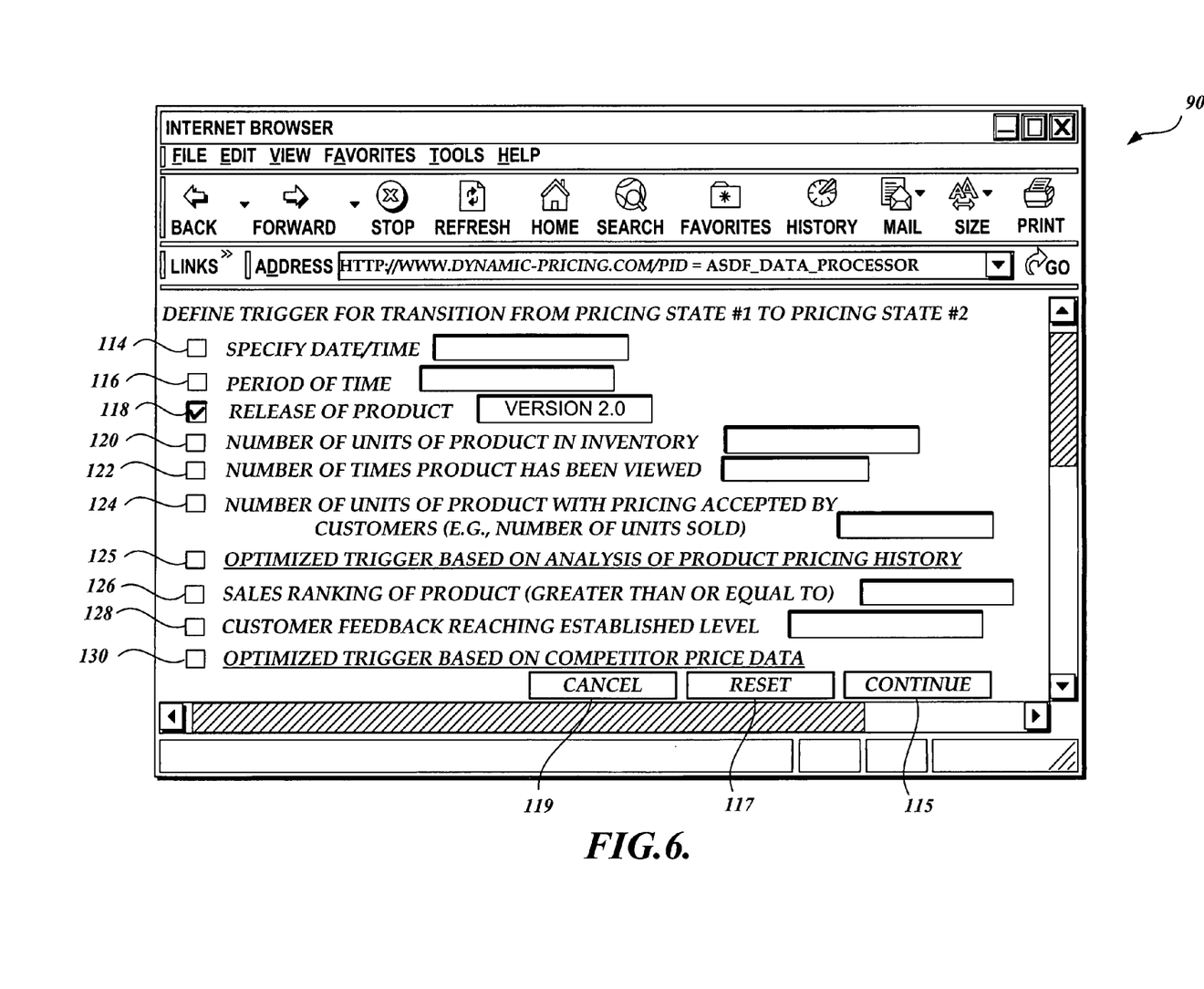

FIGS. 5-7 illustrates one embodiment of a Web user interface 90 that may be used to define a dynamic pricing program 46 such as the one illustrated in FIG. 3A. In FIG. 5, the Web user interface 90 first asks a seller to specify the name of the product 92 that is the subject of the dynamic pricing program. For example, in FIG. 5, the name of the product 92 has been specified as "ASDF Data Processor." The Web user interface 90 then asks the seller to define the pricing mechanism to be used in the initial pricing state, i.e., pricing state #1.

In this embodiment, the Web user interface 90 may list different pricing mechanisms from which the seller can choose. For example, in FIG. 5, the interface 90 provides three choices for pricing mechanisms: auction 94, discount sale 96, and rental 98. A seller can select one of the listed pricing mechanisms in this example by checking the corresponding checkbox located next to the desired pricing mechanism. For example, in FIG. 5, the seller is shown having selected the variable pricing mechanism auction 94.

When a seller has selected a pricing mechanism, the Web user interface 90 may further display input boxes for any criteria associated with the selected pricing mechanism. For example, in FIG. 5, the Web user interface 90 displays three criteria associated with the pricing mechanism auction 94 after the seller selects this pricing mechanism. These criteria are the starting price 100 of the product 92, the number of units 102 of the product 92 available for sale, and the bid price increment 104 for the product 92 during the auction. Other embodiments of the invention may associate fewer or greater criteria with each available pricing mechanism.

After the seller has specified any criteria associated with the selected pricing mechanism, the Web user interface 90 gives the seller the option to proceed to define the trigger associated with this pricing state by selecting the Continue button 110. The Web user interface 90 may also give the seller options to either cancel all input or reset the parameters shown in the current Web page. As shown in FIG. 5, the seller does so by selecting the corresponding Cancel button 106 or Reset button 108, respectively.

In the case that the seller intends to proceed with the dynamic pricing program by selecting the Continue button 110, the Web user interface 90 proceeds to display a new Web page for the seller to define the trigger associated with the current pricing state. FIG. 6 illustrates one embodiment of a Web page that enables a seller to define a trigger for transition from the current pricing state to another pricing state. In FIG. 6, the Web user interface 90 displays different trigger parameters that may be available for a seller to specify.

For example, in FIG. 6, the Web user interface 90 displays an input box 114 that allows a seller to specify a particular date or time at which the transition will occur. The Web user interface 90 also allows a seller to input a period of time 116 (e.g., six months) that the current pricing state will last before the pricing of the product 92 transitions to the next pricing state.

A seller may specify the release of a particular product version 118 as a trigger parameter for the transition. For example, in FIG. 6, the seller has selected the release of product version 2.0 as the trigger for the product 92 to transition from pricing state #1 to pricing state #2.

Continuing with FIG. 6, the seller may specify the number of units of the product remaining in inventory 120. When the seller's inventory reaches that number, the pricing program automatically transitions to the next pricing state. At reference numeral 122, the seller may specify the number of times a description of the product has been viewed by prospective customers as a trigger. For example, a Web page describing the product may keep track of the number of page views it has logged as a result of requests by potential customers. The dynamic pricing program 46 may monitor the number of page views to determine when to transition to the next pricing state.

At reference numeral 124, the Web user interface 90 allows the seller to specify the number of units of the product so far accepted by customers, which in a product sales environment reflects the number of products sold by the seller. When this number is reached, the dynamic pricing program automatically transitions to the next pricing state.

Furthermore, the seller may specify as a trigger parameter a sales ranking of the product 126. For example, a seller can specify that a transition to the next pricing state occurs when the sales ranking of the product is greater than or equal to a particular number, or if the sales ranking has increased by a determined amount. A seller may also specify that the transition occurs when customer feedback on the product reaches an established measurable level 128.

A seller may further specify a trigger parameter to be the result of analyzing the pricing history 125 of the product 92, and/or competitor pricing data 130. For example, if an analysis of the product's pricing history shows that the product 92 previously sold well at a particular price, the transition to the next pricing state may be delayed until the satisfaction of a trigger parameter; the trigger parameter is that the current sales volume of the product at that particular price no longer remains at a desired level. This trigger parameter may be associated with another trigger parameter such as a specific date for the delayed transition to occur. Alternatively, a trigger parameter may be set to observe pricing data for a competitor's product and transition to the next pricing state when the pricing of the competitor's product becomes lower than that of the seller's product. Pricing data for a competitor's product can be obtained, in one example, by periodically monitoring the Web sites for vendors of the competitor's product. Both the pricing history and competitor pricing trigger parameters 125, 130 are underlined in FIG. 6 to suggest that these parameters, or any of the other parameters, may be hyperlinked to another Web page either explaining the parameter or providing an interface for additional details about the selected trigger parameter.

After selecting one or more trigger parameters to define the trigger for transition from one pricing state to another pricing state, a seller continues to define the other pricing state by selecting the Continue button 115. The seller may choose to reset the current Web page or cancel the entire program at any time by selecting the corresponding Reset button 117 or the Cancel button 119, respectively.

In the case that the seller selects the Continue button 115 shown in FIG. 6, the Web user interface 90 displays a new Web page for the seller to define the pricing mechanism associated with another pricing state. More specifically, FIG. 7 continues the example in FIGS. 5 and 6, and illustrates the Web user interface 90 allowing a seller to specify the pricing mechanism associated with pricing state #2. In a manner similar to FIG. 5, the Web user interface 90 in FIG. 7 displays options allowing the seller to choose a pricing mechanism, e.g., auction 94, discount sale 96, and rental 98, to be associated with the pricing state. In this example, the seller has selected discount sale 96 as the pricing mechanism.

The Web user interface 90 then displays any criteria associated with a discount sale 96. For example, one embodiment of a discount sale 96 includes the criteria of a base price 134 and discount (if any) in the form of a percent discount 136 or fixed amount discount 138. Other criteria associated with the discount sale 96 may specify a floor price 142, i.e., the minimum price at which the product may sell. Additional criteria defining a discount sale 96 may be obtained by observing the price offered by a competitor 144 on the same product 92 or on a similar product.

After the seller inputs information to define the pricing mechanism in FIG. 7, the seller can continue to define additional triggers and pricing states by clicking the Continue button 146. The seller can also conclude the input to the dynamic pricing program by clicking the Conclude button 148. Upon the actuation of the Conclude button 148, the dynamic pricing program saves the input received from the seller. During the input process, the seller can click the Reset button 150 to reset the current Web page, or click the Cancel button 152 to cancel all input and exit the Web user interface 90 without saving any information.

A Web user interface may also be used to define a dynamic pricing program 46 such as the one illustrated in FIG. 3B. Such a Web user interface allows a seller to define multiple pricing states. In each pricing state, the seller may define multiple triggers, where the satisfaction of each trigger initiates the transition to any of the multiple pricing states.

In embodiments of the invention, additional functionality such as auditing and/or automatic error detection alerts may be provided to alert a user when the seller's input appears to be in error. For example, an alarm may be raised if the seller specifies a discount that results in a selling price lower than a floor price for the product. Furthermore, embodiments of the invention may allow the dynamic pricing program 46 to be executed for a group of products, rather than a single product. For example, a seller may implement a dynamic pricing program using one set of dynamic pricing information for all the books that the seller wants to sell, or all the different models of digital cameras the seller has to sell, or all the goods in a post-Christmas sale.

In some embodiments of the invention, the dynamic pricing program 46 may also suggest a pricing mechanism and a value for the price of the product based on product category, data reflecting the market demand for the product, the sales history of the product, etc. The dynamic pricing program 46 may obtain information from the seller about how fast the seller wants to distribute the product and whether the seller aims for the highest return for the product. The dynamic pricing program 46 may also provide a warning to the seller if, after analysis of data, such as market demand and sales history data, the pricing program determines the seller may have set the price of a product too high or too low.

While several embodiments of the invention have been illustrated and described above, it will be appreciated that various changes can be made therein without departing from the spirit and scope of the invention. For example, as previously described, a pricing program may be defined as a series of pricing states as shown above, each having a trigger from one state to the next or, alternatively, may include one or more parallel paths of pricing states with one or more triggers determining which "fork" in the path to follow. A pricing state at a juncture may include multiple trigger parameters leading to different pricing state paths. The first trigger parameter that is met, for example, may determine which pricing state is next (and, hence, which pricing state path the pricing program will follow). The criteria for a pricing state may also be configured to depend on an event or data arising in a previous pricing state. For example, a pricing state using a fixed price sale may set the sales price to equal the average auction value arising in one more previous auction pricing states. A trigger may also be set to transition a pricing state to a previously-employed pricing state. The scope of the invention, therefore, should be determined solely in reference to the following claims and equivalents thereto.

The embodiments of the invention in which an exclusive property or privilege is claimed are defined as follows:

1. A computer-implemented method for automated dynamic pricing of a product, comprising:
   determining a plurality of stages in a life cycle of the product;
   defining a plurality of pricing states, each pricing state correlating to at least one stage of the life cycle of the product;
   associating with each pricing state a pricing mechanism that determines the pricing of the product while the product is in the particular pricing state, wherein the pricing mechanism defines a process for determining the price of the product while in the pricing state;
   defining one or more triggers for each pricing state with at least one pricing state having multiple triggers that provide distinct transition paths to different pricing states, each trigger specifying one or more parameters that, when satisfied, cause the pricing of the product to automatically transition from one pricing state to another pricing state;
   automatically transitioning by a computer the pricing of the product, for the at least one pricing state having multiple triggers, from the at least one pricing state to one of a plurality of next pricing states along one of the distinct transition paths depending on which trigger of the multiple triggers is satisfied, wherein the pricing mechanism of the at least one pricing state is different from the pricing mechanism of the next pricing state to which the pricing of the product is caused to transition; and
   defining the pricing of the product based on the pricing mechanism of the pricing state currently applicable to the product.

2. The method of claim 1, wherein the pricing mechanism of a pricing state provides a variable pricing process for the product in which the pricing of the product varies when in the pricing state.

3. The method of claim 1, wherein the pricing mechanism of a pricing state provides a fixed pricing process for the product in which the pricing of the product does not change when in the pricing state.

4. The method of claim 3, wherein the pricing mechanism further provides a percentage discount off the pricing of the product.

5. The method of claim 3, wherein the pricing mechanism further provides an amount discount off the pricing of the product.

6. The method of claim 3, wherein the pricing of the product is determined based on competitor pricing data.

7. The method of claim 6, wherein the competitor pricing data is configured to include or exclude information from a competitor based on size, reputation, feedback, or other indicators about the competitor.

8. The method of claim 1, wherein the pricing states, pricing mechanisms, and triggers are configured based on input received from a seller.

9. The method of claim 1, wherein the method provides for automated dynamic pricing of a group of products in which the pricing of each product in the group of products is determined by the pricing mechanism of the pricing state currently applicable to the group of products.

10. The method of claim 1, wherein the pricing of the product provided by a pricing mechanism is not lower than a predetermined floor price.

11. The method of claim 1, wherein a parameter of a trigger is a specific date or time.

12. The method of claim 1, wherein a parameter of a trigger is a predefined period of time.

13. The method of claim 1, wherein a parameter of a trigger is a release of another product.

14. The method of claim 1, wherein a parameter of a trigger is a number of units of the product remaining in an inventory.

15. The method of claim 1, wherein a parameter of a trigger is a number of times a description of the product is viewed by prospective customers.

16. The method of claim 1, wherein a parameter of a trigger is a number of units of the product for which the pricing of the product has been accepted by customers.

17. The method of claim 1, wherein a parameter of a trigger is derived from analyzing a pricing history of the product.

18. The method of claim 1, wherein a parameter of a trigger is a sales ranking of the product.

19. The method of claim 1, wherein a parameter of a trigger is derived from analyzing customer feedback regarding the product.

20. The method of claim 1, wherein a parameter of a trigger is derived from analyzing competitor pricing data for the product.

21. The method of claim 20, wherein the competitor pricing data is configured to include or exclude information from a competitor based on size, reputation, feedback, or other indicators about the competitor.

22. The method of claim 1, further comprising modifying a parameter of a trigger based on another parameter.

23. A computer-readable medium having instructions stored thereon for automated dynamic pricing of a product, wherein the instructions, when executed, cause a computing apparatus to:

determine a plurality of stages in a life cycle of the product;

define a plurality of pricing states, each pricing state correlating to at least one stage of the life cycle of the product;

associate with each pricing state a pricing mechanism that determines the pricing of the product while the product is in the particular pricing state, wherein the pricing mechanism defines a process for determining the price of the product while in the pricing state;

define one or more triggers for each pricing state with at least one pricing state having multiple triggers that provide distinct transition paths to different pricing states, each trigger specifying one or more parameters that, when satisfied, cause the pricing of the product to automatically transition from one pricing state to another pricing state;

for the at least one pricing state having multiple triggers, causing the pricing of the product to automatically transition from the at least one pricing state to one of a plurality of next pricing states along one of the distinct transition paths depending on which trigger of the multiple triggers is satisfied, wherein the pricing mechanism of the at least one pricing state is different from the pricing mechanism of the next pricing state to which the pricing of the product is caused to transition; and defining the pricing of the product based on the pricing mechanism of the pricing state currently being applied to the product.

24. The computer-readable medium of claim 23, wherein the pricing mechanism of a pricing state provides a variable pricing process for the product in which the pricing of the product varies when in the pricing state.

25. The computer-readable medium of claim 23, wherein the pricing mechanism of a pricing state provides a fixed pricing process for the product in which the pricing of the product does not change when in the pricing state.

26. The computer-readable medium of claim 25, wherein the pricing mechanism provides a percentage discount off the pricing of the product.

27. The computer-readable medium of claim 25, wherein the pricing mechanism provides an amount discount off the pricing of the product.

28. The computer-readable medium of claim 25, wherein the pricing of the product is determined based on competitor pricing data.

29. The method of claim 28, wherein the competitor pricing data is configured to include or exclude information from a competitor based on size, reputation, feedback, or other indicators about the competitor.

30. The computer-readable medium of claim 23, wherein the instructions further provide for automated dynamic pricing of a group of products in which the pricing of each product in the group of products is determined by the pricing mechanism of the pricing state currently being applied to the group of products.

31. The method of claim 2, wherein the variable pricing process is an auction process.

32. The method of claim 3, wherein the fixed pricing process is a fixed price rental process.

33. The method of claim 3, wherein the fixed pricing process is a fixed price subscription process.

34. The computer-readable medium of claim 23, wherein the computing apparatus is a server that incorporates the computer-readable medium and the server is configured to execute the instructions stored on the computer-readable medium.

35. The computer-readable medium of claim 23, wherein the instructions comprise a dynamic pricing program determined from input received from a seller.

* * * * *